Jan. 1, 1929.
T. C. DELAVAL-CROW
1,697,050
BEARING MOUNTING
Filed April 28, 1923
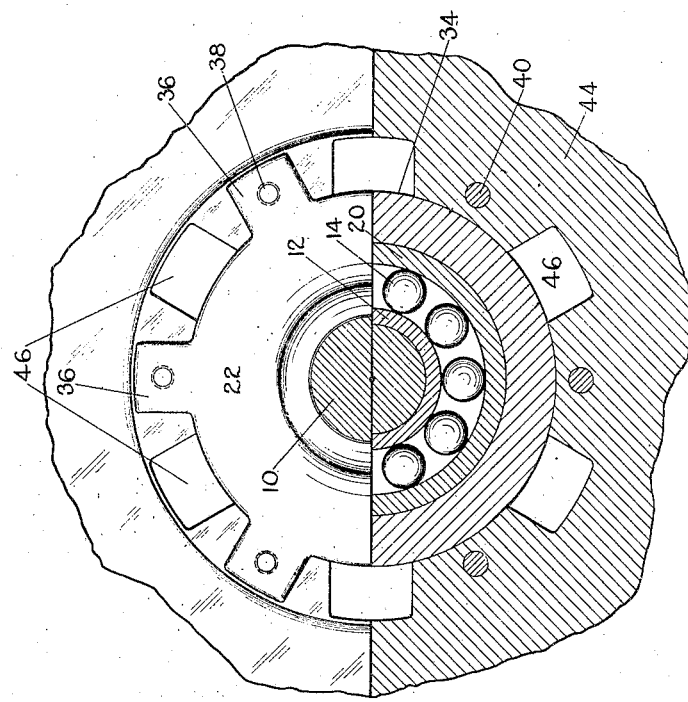
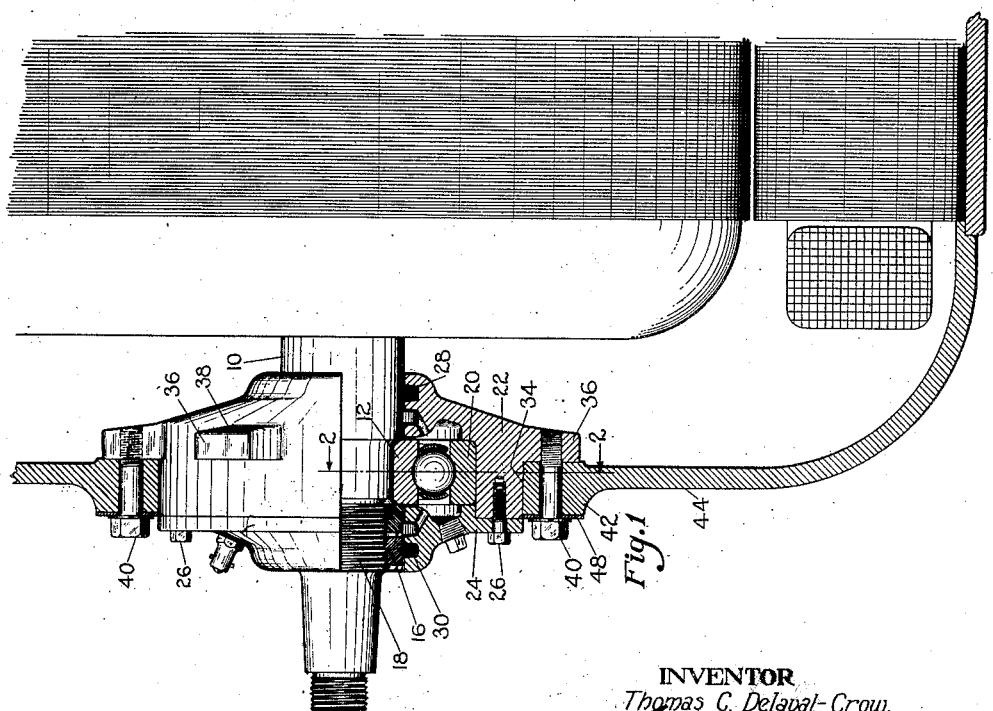
INVENTOR
Thomas C. Delaval-Crow.
BY
HIS ATTORNEY Patented Jan. 1, 1929.

1,697,050

UNITED STATES PATENT OFFICE.

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BEARING MOUNTING.

Application filed April 28, 1923. Serial No. 635,190.

This invention relates to a bearing mounting and is herein shown as embodied in a bearing mounting for the armature shaft of an electric motor.

In bearing mountings for the shafts of electric motors, it is desirable to be able to replace the bearing in service without removing any of the parts of the motor casing such as the end bell. It is also desirable to be able to remove the end bell, as when obtaining access to the motor windings, without exposing the bearing or disturbing its fit upon the shaft. In prior constructions, both of these results have not been obtainable.

It is accordingly one of the objects of this invention to provide a construction which will enable either the bearing or the end bell to be removed without disturbing the other. In the construction selected for illustrative purposes, a ball bearing is mounted on the armature shaft and provided with an enclosing housing having an interlocking connection with the end bell such that, upon the removal of a few fastenings, a slight rotary movement of the housing will allow it to be removed by axial movement. The construction also allows the end bell alone to be taken off if desired. Furthermore the motor shaft, armature, bearing housing and end bell are removable as a unit thus preserving the fit of the bearing and shielding it from dust.

To these ends and also to improve generally upon devices of the character indicated my invention consists in the various matters hereinafter described and claimed.

Referring to the drawings, Fig. 1 is a section through the bearing and its mounting in the casing of a motor.

Figure 2 is an end view with parts in section on the line 2—2 of Figure 1.

The numeral 10 designates the armature shaft, the end not shown being detachably mounted in any desired manner at the other end of the motor casing. The shaft has a shoulder against which fits the inner race ring 12 of an anti-friction bearing, preferably a ball bearing, the rolling elements of which are indicated at 14, these having a suitable cage. The inner race ring 12 is confined against the shoulder on the shaft by a nut and lock nut 16 screwed onto the threaded portion 18 of the shaft. The outer race ring 20 is held within a sectional bearing housing composed of a main inner section 22 and an outer closure section 24, the latter being fastened to the inner part by a series of screws 26. The inner part 22 of the bearing housing has a flange with a groove to retain a suitable packing ring 28 in place against the shaft and the other part 24 has a similar flange with a groove to confine a packing ring 30 in place against one of the nuts 16. Suitable threaded openings are formed in the part 24 to receive a grease cup.

The part 22 of the bearing housing has a cylindrical surface 34 and projecting from the housing, at one end of this surface 34, is a series of arms or lugs 36, each having a threaded opening as indicated at 38 for the reception of one of a series of bolts 40. The bolts 40 also pass through a boss 42 on a plate or end bell 44, the boss defining a circular opening in the end bell which closely fits the surface 34 and rotatably supports the bearing housing. The end bell has its boss 42 slotted at intervals around the rim of the opening as indicated at 46 and these slots are of sufficient width and depth to permit the passage of the arms or lugs 36 whenever the bearing housing is turned so that the arms will register with the slots. At other times, the arms interlock with the projections separating the slots and hold the bearing in place. A dust cover in the form of a ring 48 is detachably confined between the boss 42 and the heads of the bolts 40 and covers the slots 46. As shown at the bottom of Figure 1, the detachable end bell 44 has a circular lip at its outer edge arranged to fit the interior of the main section of the motor housing to make a dust proof fit therewith.

It is apparent that, by this construction, access may be had to the motor windings simply by removing the bolts 40 and sliding the end bell off the bearing housing by axial movement. It is also apparent that the motor shaft, together with the bearing housing, and end bell may also be removed as a unit without exposing the bearing or disturbing its fit on the shaft. If the bolts 40 are removed and the bearing housing is turned through a portion of a revolution so that the arms and slots will register and if the nuts 16 are backed off, the bearing and its housing alone can be slid off axially of the shaft, the flanged portion of the part 22 then contacting with the inner race ring 12 to push it off with the other parts of the bearing. The outer closure section 24 is readily removed for access to the bearings without detaching the end bell or other housing parts.

Although the invention has been described by reference to a specific construction, it should be understood that, in its broader aspects, the invention is not necessarily limited to the construction selected for illustration.

I claim:

1. In apparatus of the character described, in combination, an armature shaft, an anti-friction bearing on the shaft, a housing enclosing the bearing, an end bell, and a detachable connection between the bearing housing and the end bell constructed and arranged to allow the removal of either of the last named members without disturbing the other, said end bell having an opening to allow the bearing housing to pass axially therethrough; substantially as described.

2. In apparatus of the character described, in combination, an armature shaft, an anti-friction bearing on the shaft, a housing enclosing the bearing, an end bell, and an arm extending from one of said last named members and arranged to pass through a corresponding slot in the other member; substantially as described.

3. In an apparatus of the character described, in combination, an armature shaft, an anti-friction bearing on the shaft, a housing enclosing the bearing, an end bell, a series of arms extending from one of said last named members and arranged to pass through corresponding slots in the other member, and a ring for covering the slots; substantially as described.

4. In an apparatus of the character described, in combination, a shaft, an anti-friction bearing on the shaft, a housing enclosing the bearing and having an outer cylindrical portion, an end bell having a circular opening arranged to fit the cylindrical portion of the housing, and an interlocking connection between the housing and the end bell; substantially as described.

5. In an apparatus of the character described, in combination, a shaft, an anti-friction bearing on the shaft, a housing enclosing the bearing and having an outer cylindrical portion, an end bell having a circular opening arranged to fit the cylindrical portion of the housing, a series of arms on the housing arranged to register with corresponding slots in the end bell, and a ring for covering the slots; substantially as described.

6. In an apparatus of the character described, in combination, a shaft, an anti-friction bearing mounted on the shaft and having inner and outer race rings with interposed rolling elements, a member holding the outer race ring, a plate rotatably supporting the member and having an opening to allow the member to slide axially therethrough, and interlocking means, operable on a partial rotation, to prevent said movement; substantially as described.

7. In an apparatus of the character described, in combination, a shaft, an anti-friction bearing mounted on the shaft and having inner and outer race rings with interposed rolling elements, a member holding the outer race ring, a plate having an opening fitting the member, and a registerable arm and slot on the plate and member.

8. In apparatus of the character described, in combination, a casing having an end plate, a shaft, an inner race ring on the shaft, a nut for clamping the inner race ring on the shaft, an outer race ring, antifriction elements between the race rings, a sectional housing enclosing the bearing, said housing comprising a main section surrounding and fitting the outer race ring and having a portion surrounding and making a close joint with the shaft at the inner side of the bearing and end plate, a closure section secured to the main section at the outer side of the bearing and end plate and having a portion making a close joint with said clamping nut, the closure section being removable for access to the bearing without detaching the end plate, and means for detachably securing the main section of the bearing housing rigidly to the end plate; substantially as described.

9. In apparatus of the character described, in combination, a casing having a detachable end plate, a shaft, an inner race ring on the shaft, an outer race ring, antifriction elements between the race rings, a sectional housing enclosing the bearing and fitting in said end plate, said housing comprising a main section surrounding and fitting the outer race ring and having a portion surrounding and making a close joint with the shaft at the inner side of the bearing, a closure section secured to the main section at the outer side of the bearing, and a screw bolt extending through said end plate and into said main housing section to secure the latter rigidly in the end plate; substantially as described.

In testimony whereof I hereunto affix my signature.

THOMAS C. DELAVAL-CROW.